US008760120B2

(12) United States Patent
Hasler

(10) Patent No.: US 8,760,120 B2
(45) Date of Patent: Jun. 24, 2014

(54) METHODS FOR DE-ENERGIZING A CHAIN-LINK CONVERTER, CONTROLLER, COMPUTER PROGRAMS AND COMPUTER PROGRAM PRODUCTS

(71) Applicant: Jean-Philippe Hasler, Vasteras (SE)

(72) Inventor: Jean-Philippe Hasler, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/090,766

(22) Filed: Nov. 26, 2013

(65) Prior Publication Data
US 2014/0077767 A1 Mar. 20, 2014

Related U.S. Application Data

(63) Continuation of application No. PCT/EP2011/059645, filed on Jun. 10, 2011.

(51) Int. Cl.
*H01M 10/44* (2006.01)
*H02J 7/00* (2006.01)
(52) U.S. Cl.
CPC .................................. *H02J 7/0026* (2013.01)
USPC ....................................................... 320/128
(58) Field of Classification Search
CPC ......... H02J 7/0026; H02J 7/042; H02J 1/102; H02J 3/383; H02J 3/385; Y02E 10/58; Y02E 10/563; Y02T 10/58
USPC .......... 320/128, 135, 140, 163, 164; 363/131, 363/40, 89, 90
See application file for complete search history.

(56) References Cited

U.S. PATENT DOCUMENTS

| | | | | | |
|---|---|---|---|---|---|
| 6,731,525 | B2 * | 5/2004 | Meiners | | 363/148 |
| 8,570,005 | B2 * | 10/2013 | Lubomirsky | | 323/259 |
| 2009/0160259 | A1 * | 6/2009 | Naiknaware et al. | | 307/82 |
| 2010/0060235 | A1 | 3/2010 | Dommaschk et al. | | |
| 2011/0007537 | A1 * | 1/2011 | Fornage | | 363/132 |

FOREIGN PATENT DOCUMENTS

| | | |
|---|---|---|
| CN | 2785249 Y | 5/2006 |
| JP | 2009247186 A | 10/2009 |
| WO | 2007112378 A2 | 10/2007 |
| WO | 2010145690 A1 | 12/2010 |
| WO | 2011015227 A1 | 2/2011 |

OTHER PUBLICATIONS

Sirisukprasert, et al.: "A high-frequency 1.5 MVA H-bridge building block for cascaded multilevel converters using emitter turn-off thyristor"; Applied Power Electronics Conference and Exposition, 2002. APEC 2002. Seventeenth Annual IEEE (vol. 1 ); 2002; pp. 27-32.

(Continued)

*Primary Examiner* — Edward Tso
(74) *Attorney, Agent, or Firm* — St. Onge Steward Johnston & Reens LLC

(57) ABSTRACT

A method for de-energizing a chain-link converter including one or more phase legs each phase leg having a number of series-connected converter cells. The phase legs are connected to a respective charging resistor. The method includes the steps of: opening AC circuit breakers arranged between a power grid and the chain-link converter, opening charging resistors switches arranged in parallel with a respective one of charging resistors, and circulating a current within the chain-link converter through the charging resistors and each phase leg, whereby the DC capacitor are discharged. The invention also relates to a controller, computer program and computer program products.

10 Claims, 3 Drawing Sheets

(56) References Cited

OTHER PUBLICATIONS

Han, et al.; "An ETO Thyristor and Modular H-bridge PWM Converter-based 4.5MVA STATCOM: 480V/500A Transformerless Grid-Connected Experimentation"; Industry Applications Conference, 2006. 41st IAS Annual Meeting. Conference Record of the 2006 IEEE (vol. 2 ); pp. 1039-1044.
International Search Report and Written Opinion of the International Searching Authority Application No. PCT/EP2011/059645 Completed: May 4, 2012; Mailing Date: May 18, 2012 11 pages.

* cited by examiner

METHODS FOR DE-ENERGIZING A CHAIN-LINK CONVERTER, CONTROLLER, COMPUTER PROGRAMS AND COMPUTER PROGRAM PRODUCTS

FIELD OF THE INVENTION

The invention relates generally to static synchronous compensator converters, and in particular to methods for de-energizing such converters.

BACKGROUND OF THE INVENTION

STATCOM (Static synchronous Compensator) converters based on chain-link topology are well known and provide reactive power to high-voltage electricity transmission systems and are used e.g. for regulating voltage and stabilizing the system. The STATCOM converter comprises a number of converter cells, each converter cell comprising valves arranged in an H-bridge connection with a DC capacitor.

Occasionally, the STATCOM converter needs to be shut down, for example due to scheduled maintenance work or because of a required repair or exchange of components. When shutting down the STATCOM converter, DC capacitors thereof have to be discharged. This is accomplished by means of leakage current of the DC capacitors and by means of circuitry provided in the converter cells.

However, the discharge time is long, and the shutting down of the STATCOM converter is therefore a time consuming procedure. In case the STATCOM converter needs repair in order to be put back into operation, the availability of the converter is limited during a rather long time before reaching voltage levels that are safe for allowing personel to approach the STATCOM converter.

SUMMARY OF THE INVENTION

An object of the invention is to enable a faster shut-down of a chain-link converter.

The object is according to a first aspect of the invention achieved by a method for de-energizing a chain-link converter comprising one or more phase legs. Each phase leg comprises a number of series-connected converter cells, each converter cell comprising four valves arranged in an H-bridge connection with a DC capacitor. Each valve in turn comprises a semiconductor switch in parallel with a diode, the phase legs being connected to a respective charging resistor. The method comprises the steps of: opening AC circuit breakers arranged between a power grid and the chain-link converter; opening charging resistors switches arranged in parallel with a respective one of charging resistors; and circulating a current within the chain-link converter through the charging resistors and each phase leg, whereby the DC capacitor are discharged.

By means of the invention, a rapid shutdown of the chain-link converter is enabled. The discharging of the DC capacitors is performed in an accelerated manner by the forcing a circulating current through the phase legs and a set of charging resistors. The mean time for rendering the chain-link converter accessible for repair is reduced considerably.

In an embodiment, the method comprises the further step of bypassing any faulty converter cells after the step of opening the charging resistors switches.

In an embodiment, the method comprises the further steps of: detecting that the DC capacitor voltage is below a level enabling control of the semiconductor switches, and using a discharge circuit connected to each of the semiconductor switches for enabling further discharge of the semiconductor switches.

In an embodiment, the step of circulating a current within the chain-link converter through the charging resistors and each phase leg comprises sending firing pulses to the semiconductor switches.

In an embodiment, the chain-link converter comprises three phase legs connected in a delta connection, the phase legs and the charging resistor thus making up a closed circuit.

In another embodiment, the chain-link converter comprises three phase legs connected in a wye connection, and wherein a tuned zero sequence filter is arranged between the star point of the wye connected phase legs and respective points between the AC circuit breakers and a respective charging resistor.

In a variation of the above embodiment, the tuned zero sequence filter comprises a zig-zag transformer, series-connected with a phase reactor, in turn series-connected with a filter device, and wherein the filter device is connected to the star point of the wye connected phase legs, and wherein the zig-zag transformer is connected to each of the phase legs at points between the AC circuit breakers and a respective charging resistor.

The object is according to a second aspect of the invention achieved by a controller for de-energizing a chain-link converter comprising one or more phase legs. Each phase leg comprises a number of series-connected converter cells, and each converter cell comprises four valves arranged in an H-bridge connection with a DC capacitor. Each valve in turn comprises a semiconductor switch in parallel with a diode. The phase legs are connected to a respective charging resistor. The controller is arranged to: open AC circuit breakers arranged between a power grid and the chain-link converter, open charging resistors switches arranged in parallel with a respective one of charging resistors; and circulate a current within the chain-link converter through the charging resistors and each phase leg, whereby the DC capacitor are discharged.

The object is according to a third aspect of the invention achieved by a computer program for de-energizing a chain-link converter comprising one or more phase legs. Each phase leg comprises a number of series-connected converter cells, and each converter cell comprises four valves arranged in an H-bridge connection with a DC capacitor. Each valve in turn comprises a semiconductor switch in parallel with a diode, and the phase legs are connected to a respective charging resistor. The computer program comprises computer program code, which, when run on a controller, causes the controller to perform the steps of: opening AC circuit breakers arranged between a power grid and the chain-link converter; opening charging resistors switches arranged in parallel with a respective one of charging resistors; and circulating a current within the chain-link converter through the charging resistors and each phase leg, whereby the DC capacitor is discharged.

The object is according to a fourth aspect of the invention achieved by a computer program product comprising a computer program as above, and a computer readable means on which the computer program is stored.

Further features and advantages of the invention will become clear upon reading the following description and the accompanying drawings.

DETAILED DESCRIPTION OF THE INVENTION

Figure 1:
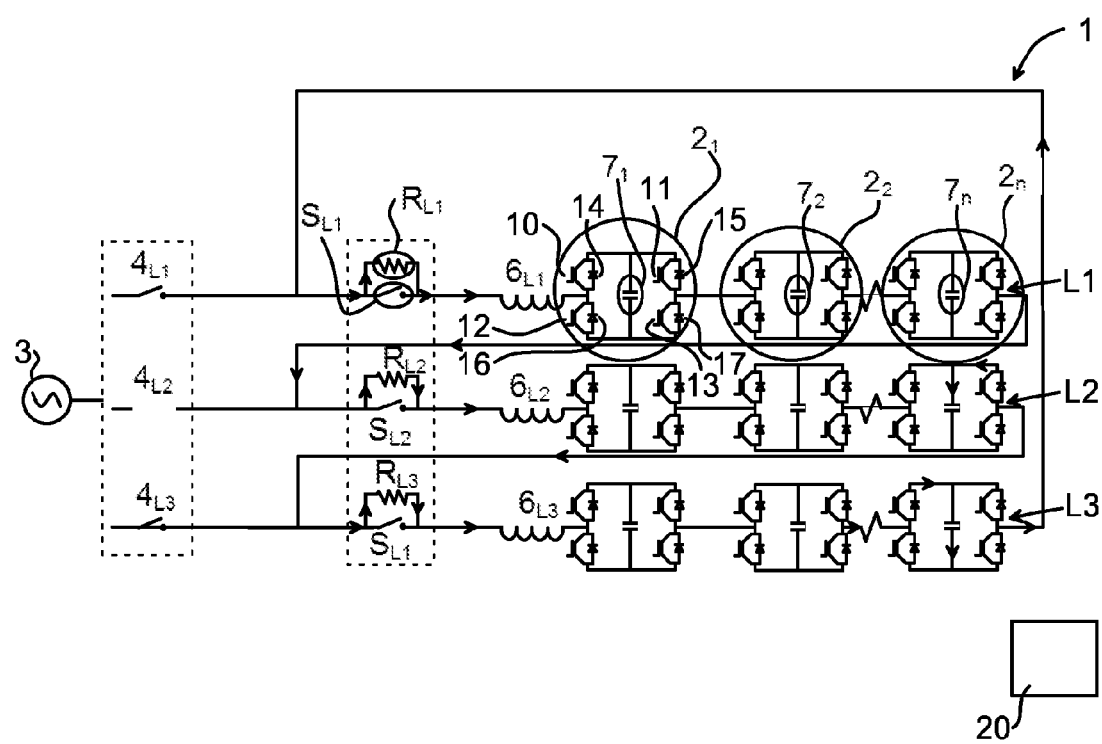
FIG. 1 illustrates a delta-connected three-phase chain-link converter, for which aspects of the invention may be implemented.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Same reference numerals refer to like elements throughout the description.

FIG. 1 illustrates a delta-connected three-phase chain-link converter, for which aspects of the invention may be implemented. The three-phase chain link converter 1 comprises a voltage source converter having three phase legs L1, L2, L3, in the illustrated case connected in a delta arrangement. Each phase leg L1, L2, L3 comprises a number of series-connected converter cells, also denoted converter links. Taking phase leg L1 as an example, it comprises converter cells $2_1, 2_2, \ldots, 2_n$, each converter cell comprising four valves connected in a H-bridge arrangement with a capacitor unit $7_1, 7_2, \ldots, 7_n$. Each valve in turn comprises a transistor switch, such as an insulated gate bipolar transistor (IGBT), having a free-wheeling diode connected in anti-parallel thereto. In the following IGBT is used when describing aspects of the invention, but other semiconductor devices could be used, e.g. gate turn-off transistors (GTO) or Integrated Gate-Commutated Thyristors (IGCT). Taking the first converter cell $2_1$ of the first phase-leg as an example, it comprises four IGBTs 10, 11, 12, 13 having respective diodes 14, 15, 16, 17 connected in anti-parallel thereto.

The phase leg L1 is connected to an electrical power grid 3, e.g. a three-phase power grid, via a phase reactor $6_{L1}$. Further, the phase leg L1 is connected to the power grid 3 via a charging resistor $R_{L1}$ connected in parallel with a charging resistor switch $S_{L1}$ and via an AC circuit breaker $4_{L1}$. The other phase legs L2, L3 are arranged in a corresponding manner.

Figure 2:
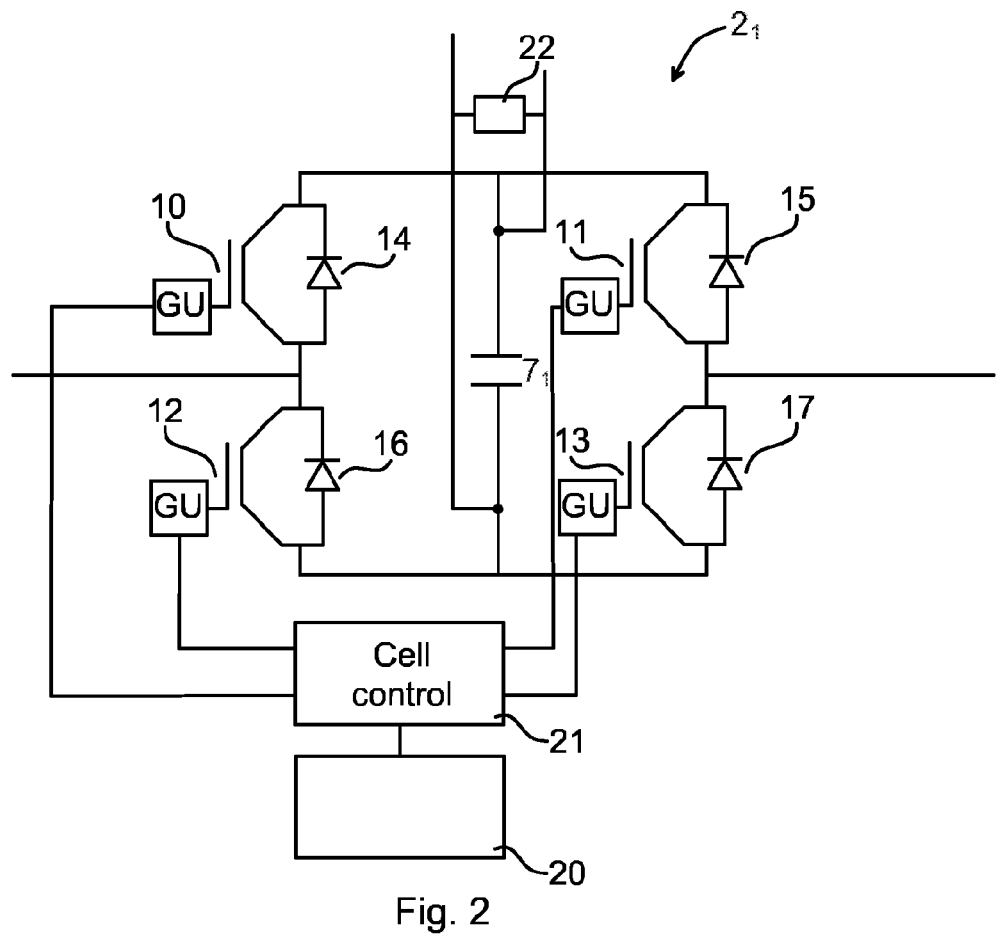
FIG. 2 illustrates a converter cell of the chain-link converter of FIG. 1.

A controller 20 is arranged to control the chain-link converter 1, the control comprising for example controlling the switching of the IGBTs of the converter cells in dependence on set reference values. Each IGBT of each converter cell is connected to a gate unit. With reference now to FIG. 2, the first converter cell $2_1$ of the first phase leg L1 is illustrated. The other converter cells of all phase legs L1, L2, L3 of the chain-link converter 1 are identical to this converter cell $2_1$. Each IGBT 10, 11, 12, 13 is connected to a respective gate unit GU. The gate units in turn are connected to a converter cell control and protection unit 21. The converter cell control and protection unit 21 of the first converter cell $2_1$ of the first phase leg L1, as well as other such converter cell control and protection units are able to communicate with the controller 20, for example by being connected to a communication bus (not illustrated).

Further, the converter cells are provided with a discharge circuit 22 connected so as to enable discharging of the DC capacitors of the converter cells, e.g. $7_1$ of converter cell $2_1$. The discharge circuit 22 is only illustrated very schematically and may be one that is conventionally used, e.g. comprising an IGBT switch in series with a resistor. The discharge circuit 22 can be seen as the equivalent resistance of the gate unit which is connected moreover to the gate of the IGBT between collector-emitter of the IGBT.

In accordance with an aspect of the invention, a method is provided enabling a rapid shut-down of the chain-link converter 1. Briefly, the charging resistors $R_{L1}, R_{L2}, R_{L3}$ and their associated charging resistor switches $S_{L1}, S_{L2}, S_{L3}$ are used for decreasing the energy stored in the DC capacitors. The charging resistor of a phase leg L1, L2, L3 is connected in series with the phase reactor $6_{L1}, 6_{L2}, 6_{L3}$, of the respective phase leg. The charging resistor is thus connected at one end thereof to the phase reactor and at the other end connected to the main AC circuit breaker.

In accordance with an embodiment, the chain-link converter 1 is de-energized and shut-down in accordance with the following sequence, described only for the first phase leg L1 for rendering the description clear and concise. The second and third phase legs L2, L3 of the chain-link converter 30 are de-energized simultaneously by performing the same sequence as will become evident.

Firstly, the main AC circuit breaker $4_{L1}$ is opened thus isolating the chain-link converter 1 from the power grid 3. This can be accomplished by control signaling from the controller 20 or from some other controller (not illustrated).

Next, the IGBTs of the converter cells are blocked so that the current into the chain-link converter 1 is zero. The IGBTs are controlled as described earlier, and control signals, such as firing pulses (switching signals) and blocking signals, can be sent from the controller 20 arranged to control the chain-link converter 1.

The charging resistor switch $S_{L1}$ is then opened. This can be accomplished by the controller 20 controlling the chain-link converter or by another controller (not illustrated) sending a control signal to this end ("open switch"-signal).

If there are faulty converter cells these are bypassed, for example by closing a bypass switch arranged in parallel with the converter cells. Other means for bypassing converter cells of a chain-link converter are known and can be used.

The remaining converter cells, i.e. all healthy converter cells, are now controlled so as to start to generate an output voltage to force a circulating current inside the delta-connected chain-link converter 1. The current circulation is indicated by arrows in FIG. 1. The energy output of the DC capacitors is absorbed by the charging resistors $R_{L1}, R_{L2}, R_{L3}$, the DC capacitors thus being de-energized.

After a while the voltage of the DC capacitors will be reduced so much that it is not high enough for being able to power supply the control circuitry of the IGBTs of the converter cells. i.e. control board of the electronic switches. Thus the current can longer be circulated. However, about 90% of the stored energy has now been discharged (in the previous step) and the discharge circuit 22 can be used for discharging the DC capacitors further, if required.

Figure 3:
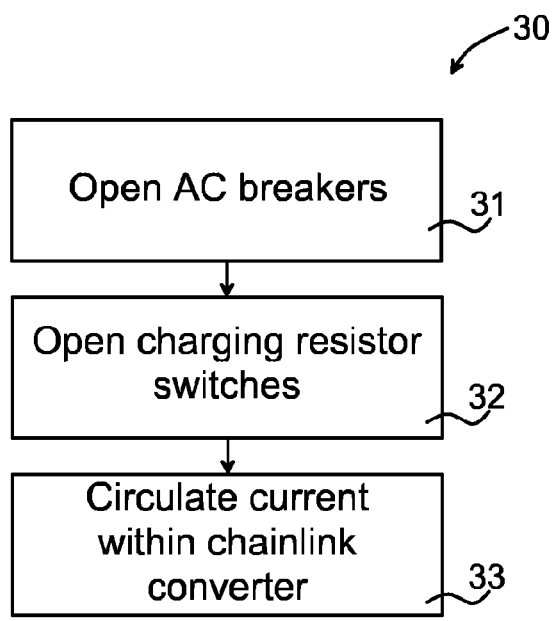
FIG. 3 illustrates a flow chart over steps of a method in an embodiment of the invention.

The steps of the above sequence can be used for implementing a method for de-energizing the chain-link converter 1. FIG. 3 illustrates a flow chart over steps of a method in an embodiment of the invention.

The method 30 may be implemented in the controller 30 and be used for de-energizing the chain-link converter 1 as described. The method 30 comprises the first step of opening 31 the AC circuit breakers $4_{L1}$, $4_{L2}$, $4_{L3}$ arranged between the power grid 3 and the chain-link converter 1.

The method 30 comprises the second step of opening 32 charging resistors switches $S_{L1}$, $S_{L2}$, $S_{L3}$ arranged in parallel with a respective one of charging resistors $R_{L1}$, $R_{L2}$, $R_{L3}$.

The method 30 comprises the third step of circulating 33 a current within the chain-link converter 1 through the charging resistors $R_{L1}$, $R_{L2}$, $R_{L3}$ and each phase leg L1, L2, L3. Thereby the DC capacitors $7_1$, $7_2$, ..., $7_n$ are discharged. This step of circulating 33 the current within the chain-link converter 1 may be accomplished by sending firing pulses to the semiconductor switches 10, 11, 12, 13 from the controller 20.

In an embodiment, the method 30 comprises the further steps of detecting that the DC capacitor $7_1$, $7_2$, ..., $7_n$ voltage is below a level enabling control of the semiconductor switches 10, 11, 12, 13; and using the discharge circuit 22 connected to each of the semiconductor switches 10, 11, 12, 13 for enabling further discharge of the semiconductor switches 10, 11, 12, 13.

It is noted that in embodiments of the method 30 further additional steps may be included.

Figure 4:
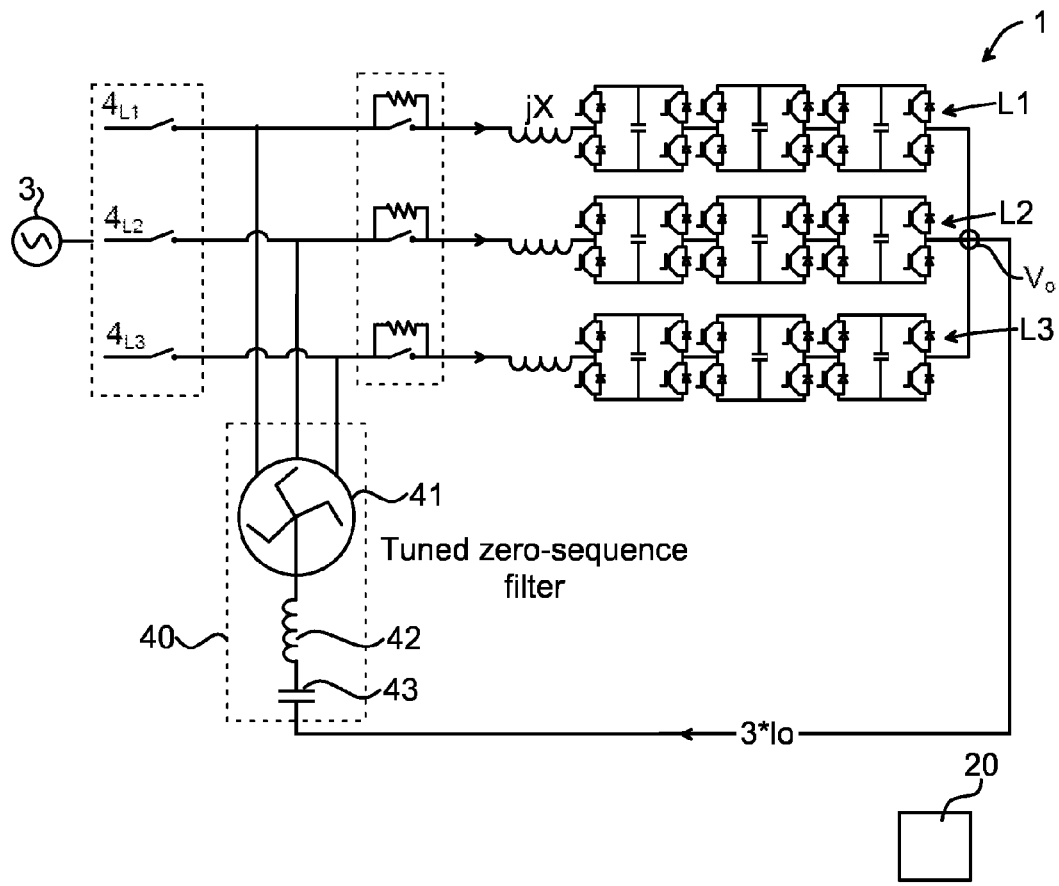
FIG. 4 illustrates a wye-connected three-phase chain-link converter, for which aspects of the invention may be implemented.

FIG. 4 illustrates the chain-link converter 1 in a wye connection arrangement. In this case, a tuned zero-sequence filter 40 is provided for enabling the current to circulate through the phase legs L1, L2, L3 and the charging resistors $R_{L1}$, $R_{L2}$, $R_{L3}$, thus de-energizing the DC capacitors.

The tuned zero-sequence filter 40 comprises in a first embodiment a zig-zag transformer 41 having a suitably chosen impedance Z, i.e. high impedance for positive current and negative current but low impedance for zero sequence current. The tuned zero-sequence filter 40 further comprises a phase reactor 42 and a filter device 43. The filter device 43 is chosen suitably, passing harmonics chosen for use in discharging the converter cells. The zig-zag transformer 41, the phase reactor 42 and the filter device 43 of the zero-sequence filter 40 are connected in series to each other.

The tuned zero-sequence filter 40 is thus arranged so as to enable the circulation of current even for a wye connected chain-link converter. In particular, the zig-zag transformer 41 is connected to the phase legs L1, L2, L3 at points between the main AC circuit breakers $4_{L1}$, $4_{L2}$, $4_{L3}$ and the respective pairs of charging resistor $R_{L1}$, $R_{L2}$, $R_{L3}$ and charging resistor switch $S_{L1}$, $S_{L2}$, $S_{L3}$. The star point $V_0$, also denoted neutral point, of the phase legs L1, L2, L3 is connected to the filter device 43 (which is series-connected to the phase reactor 42, which is series-connected to the zig-zag transformer 41).

As an alternative to the described zig-zag transformer 41, the filter 40 may comprise a transformer (not illustrated) which on its primary side is connected to the AC inputs via a wye connection which provides a transformer neutral point, which transformer neutral point is in electrical connection with the neutral point of the compensator. Hence, a regular transformer which is not a zig-zag transformer may be utilised in order to provide the filter effect as described above. The secondary side of the transformer should be a delta connection.

Figure 5:
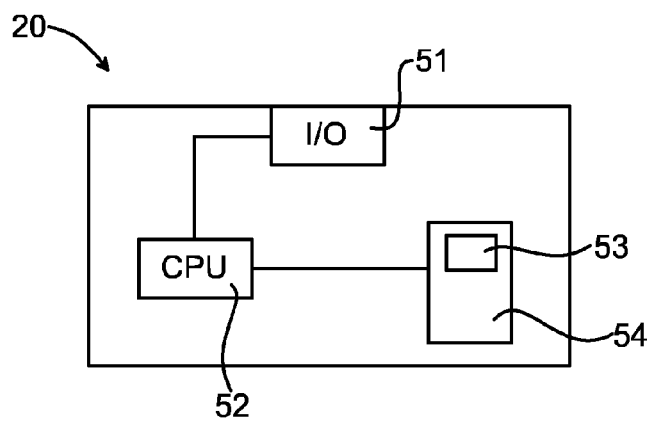
FIG. 5 illustrates a controller for controlling a chain-link converter.

FIG. 5 illustrates means for implementing the methods as described, and in particular the controller 20 for controlling a chain-link converter as described. The controller 20 comprises a processor 52, e.g. a central processing unit, microcontroller, digital signal processor (DSP), etc., capable of executing software instructions stored in a computer program product 54 e.g. in the form of a memory. The processor 52 is connected to an input device 51, that receives inputs e.g. from the earlier described converter cell control and protection units 21 connected to gate units of the converter cells $2_1$, $2_2$, ..., $2_n$. It is noted that although only one processor 52 is illustrated in FIG. 5, the implementation may comprise distributed hardware so that several CPUs are used rather than one when running the software. Likewise, although only one input device 51 is illustrated, there may be several input devices.

The described methods and algorithms or parts thereof for de-energizing the chain-link converter 1 may be implemented e.g. by software and/or application specific integrated circuits in the processor 52. To this end, the controller 20 may further comprise a computer program 53 stored on the computer program product 54.

With reference still to FIG. 5, the invention also encompasses such computer program 53 for handling de-energizing of chain-link converters. The computer program 53 comprises computer program code which when run on the controller 50, and in particular the processor 52 thereof, causes the controller 50 to perform the methods as described.

A computer program product 54 is thus also provided comprising the computer program 53 and computer readable means on which the computer program 53 is stored. The computer program product 54 can be any combination of read and write memory (RAM) or read only memory (ROM). The computer program product 54 may also comprise persistent storage, which, for example can be any single one or combination of magnetic memory, optical memory, or solid state memory.

What is claimed is:

1. A method for de-energizing a chain-link converter comprising one or more phase legs, each phase leg comprising a number of series-connected converter cells, each converter cell comprising four valves arranged in an H-bridge connection with a DC capacitor, and each valve in turn comprising a semiconductor switch in parallel with a diode, the phase legs being connected to a respective charging resistor, the method comprising the steps of:
   opening AC circuit breakers arranged between a power grid and the chain-link converter,
   opening charging resistors switches arranged in parallel with a respective one of charging resistors, and
   circulating a current within the chain-link converter through the charging resistors and each phase leg, whereby the DC capacitor are discharged.

2. The method as claimed in claim 1, comprising the further step of bypassing any faulty converter cells after the step of opening the charging resistors switches.

3. The method as claimed in claim 2, comprising the further steps of:
   detecting that the DC capacitor voltage is below a level enabling control of the semiconductor switches, and
   using a discharge circuit connected to each of the semiconductor switches for enabling further discharge of the semiconductor switches.

4. The method as claimed in claim 1, wherein the step of circulating a current within the chain-link converter through the charging resistors and each phase leg comprises sending firing pulses to the semiconductor switches.

5. The method as claimed in claim 1, wherein the chain-link converter comprises three phase legs connected in a delta connection, the phase legs and the charging resistor thus making up a closed circuit.

6. The method as claimed in claim 1, wherein the chain-link converter comprises three phase legs connected in a wye connection, and wherein a tuned zero sequence filter is arranged between the star point of the wye connected phase legs and respective points between the AC circuit breakers and a respective charging resistor.

7. The method as claimed in claim 6, wherein the tuned zero sequence filter comprises a zig-zag transformer, series-connected with a phase reactor, in turn series-connected with a filter device, and wherein the filter device is connected to the star point of the wye connected phase legs, and wherein the zig-zag transformer is connected to each of the phase legs at points between the AC circuit breakers the respective charging resistor.

8. A controller for de-energizing a chain-link converter comprising one or more phase legs, each phase leg comprising a number of series-connected converter cells, each converter cell comprising four valves arranged in an H-bridge connection with a DC capacitor, and each valve in turn comprising a semiconductor switch in parallel with a diode, the phase legs being connected to a respective charging resistor, the controller arranged to:
  open AC circuit breakers arranged between a power grid and the chain-link converter,
  open charging resistors switches arranged in parallel with a respective one of charging resistors, and
  circulate a current within the chain-link converter through the charging resistors and each phase leg, whereby the DC capacitor are discharged.

9. A computer program for de-energizing a chain-link converter comprising one or more phase legs, each phase leg comprising a number of series-connected converter cells, each converter cell comprising four valves arranged in an H-bridge connection with a DC capacitor, and each valve in turn comprising a semiconductor switch in parallel with a diode, the phase legs being connected to a respective charging resistor, the computer program comprising computer program code, which, when run on a controller, causes the controller to perform the steps of:
  opening AC circuit breakers arranged between a power grid and the chain-link converter,
  opening charging resistors switches arranged in parallel with a respective one of charging resistors, and
  circulating a current within the chain-link converter through the charging resistors and each phase leg, whereby the DC capacitor are discharged.

10. A computer program product comprising a computer program as claimed in claim 9, and a computer readable means on which the computer program is stored.

* * * * *